US010338780B2

(12) United States Patent
Chen

(10) Patent No.: US 10,338,780 B2
(45) Date of Patent: Jul. 2, 2019

(54) SYSTEM AND METHOD FOR GRAPHICAL RESOURCES MANAGEMENT AND COMPUTER PROGRAM PRODUCT WITH APPLICATION FOR GRAPHICAL RESOURCES MANAGEMENT

(71) Applicant: Chao-Wei Chen, Taipei (TW)

(72) Inventor: Chao-Wei Chen, Taipei (TW)

( * ) Notice: Subject to any disclaimer, the term of this patent is extended or adjusted under 35 U.S.C. 154(b) by 119 days.

(21) Appl. No.: 15/622,013

(22) Filed: Jun. 13, 2017

(65) Prior Publication Data
US 2017/0364215 A1 Dec. 21, 2017

(30) Foreign Application Priority Data
Jun. 15, 2016 (TW) .............................. 105118716 A

(51) Int. Cl.
| G06F 3/048 | (2013.01) |
| G06F 3/0482 | (2013.01) |
| G06F 16/583 | (2019.01) |
| G06F 16/58 | (2019.01) |
| G06F 3/0488 | (2013.01) |
| G06F 3/0484 | (2013.01) |

(52) U.S. Cl.
CPC .......... G06F 3/0482 (2013.01); G06F 3/0488 (2013.01); G06F 3/04842 (2013.01); G06F 16/5838 (2019.01); G06F 16/5866 (2019.01)

(58) Field of Classification Search
CPC .. G06F 3/147; G06F 17/3053; G06F 3/04842; G06F 3/0482; G06F 3/0488; G06F 3/04817; G06F 16/5838; G06F 16/5866
See application file for complete search history.

(56) References Cited

U.S. PATENT DOCUMENTS

| 8,702,504 B1* | 4/2014 | Hughes | G06F 3/04842 463/31 |
| 8,799,815 B2* | 8/2014 | Hoellwarth | G06F 3/04817 715/811 |
| 2002/0054164 A1* | 5/2002 | Uemura | G06F 3/04815 715/848 |
| 2002/0080180 A1* | 6/2002 | Mander | G06F 3/0483 715/769 |
| 2004/0201752 A1* | 10/2004 | Parulski | G06Q 30/06 348/231.99 |
| 2005/0210410 A1* | 9/2005 | Ohwa | G06F 3/0482 715/821 |
| 2006/0235817 A1* | 10/2006 | Wong | G06F 8/60 |
| 2008/0189270 A1* | 8/2008 | Takimoto | G06F 16/58 |
| 2009/0153676 A1* | 6/2009 | Nakase | G11B 27/105 348/207.99 |
| 2010/0299364 A1* | 11/2010 | Baldwin | G06F 17/279 707/797 |

(Continued)

*Primary Examiner* — Linh K Pham
(74) *Attorney, Agent, or Firm* — Chun-Ming Shih

(57) ABSTRACT

A system and a method for graphical resources management, and a computer program product with an application for graphical resources management are provided, which may capture groups of pixels from imported graphical resources to generate a plurality of graphical items, edit relationships between the graphical items, and generate a graphical data structure that demonstrates the relationships between the graphical items. The invention allows a user to logically manage graphical resources in a structured manner, and thus enables efficient management of graphical resources.

13 Claims, 15 Drawing Sheets

(56) References Cited

U.S. PATENT DOCUMENTS

| | | | |
|---|---|---|---|
| 2011/0087666 A1* | 4/2011 | Chou | G06F 17/30247 707/737 |
| 2011/0181617 A1* | 7/2011 | Tsuda | G06F 3/0481 345/619 |
| 2011/0208732 A1* | 8/2011 | Melton | G06F 16/986 707/728 |
| 2012/0096389 A1* | 4/2012 | Flam | G06F 16/168 715/777 |
| 2012/0117474 A1* | 5/2012 | Miki | H04N 5/76 715/732 |
| 2012/0317477 A1* | 12/2012 | Kotake | G06F 3/04842 715/243 |
| 2013/0004064 A1* | 1/2013 | Yamaguchi | G06K 9/46 382/164 |
| 2013/0076705 A1* | 3/2013 | Murata | G06F 16/54 345/204 |
| 2013/0101223 A1* | 4/2013 | Kawanishi | H04N 5/91 382/195 |
| 2013/0166477 A1* | 6/2013 | Malik | G06Q 40/00 705/400 |
| 2014/0079324 A1* | 3/2014 | Ishige | G06T 11/60 382/224 |
| 2014/0160001 A1* | 6/2014 | Kinnebrew | G06F 3/012 345/156 |
| 2014/0351745 A1* | 11/2014 | Shupp | G06F 3/0485 715/784 |
| 2015/0077376 A1* | 3/2015 | Masuda | G06F 3/0488 345/173 |
| 2015/0253862 A1* | 9/2015 | Seo | G06F 3/017 715/863 |
| 2015/0356944 A1* | 12/2015 | Hsieh | G09G 5/02 382/165 |
| 2016/0085327 A1* | 3/2016 | Lee | H04M 1/0214 345/173 |
| 2016/0253564 A1* | 9/2016 | Jeong | G06K 9/00684 382/305 |
| 2016/0274728 A1* | 9/2016 | Luo | G06F 3/0488 |
| 2016/0295157 A1* | 10/2016 | Cho | H04N 5/77 |
| 2017/0017844 A1* | 1/2017 | Jeong | G06K 9/00718 |
| 2017/0040036 A1* | 2/2017 | Ryu | G11B 27/031 |
| 2017/0068857 A1* | 3/2017 | Lee | H04N 5/23293 |

* cited by examiner

SYSTEM AND METHOD FOR GRAPHICAL RESOURCES MANAGEMENT AND COMPUTER PROGRAM PRODUCT WITH APPLICATION FOR GRAPHICAL RESOURCES MANAGEMENT

CROSS-REFERENCE TO RELATED APPLICATIONS

This application claims the priority of Republic of China Patent Application No. 105118716 filed on Jun. 15, 2016, in the State Intellectual Property Office of the R.O.C., the disclosure of which is incorporated herein by reference.

BACKGROUND OF THE INVENTION

Field of the Invention

The invention relates to file resources management technologies, and more particularly, to a system and a method for graphical resources management, and a computer program product with an application for graphical resources management.

Descriptions of the Related Art

Advances in electronics and computer sciences has brought about wider application of various computing devices, including mobile, desktop, and cloud computing devices. Computing devices are provided with increasing larger storage capacities, that allows more static graphical resources (e.g. photos, images, etc.) and dynamic graphical resources (e.g. videos, animations, etc.) to be stored. However, many of present day computer applications still manage and present the graphical resources in a rather simplistic manner, often showing them in a list that sort the resources based on attributes such as its file name or associated date. A user who wish to visualize specific graphical resources in a certain manner may need to spend a long time through an unhandy interface in order to do so.

Moreover, although note taking applications allowing insertion of camera acquired images are available, most applications allow only import of the whole image, and allow only simple annotation of the image. A user may neither process or classify the imported image in a more detailed manner, nor presents the images according to the user's preferences.

This art aims to enable efficient management of graphical resource, and generation of documents and flashcards, thus allowing visualization of information for the purposes such as idea presentation, idea development, and facilitation of logical thinking and memorization.

SUMMARY OF THE INVENTION

In view of the above and other drawbacks of the conventional technology, a primary objective of the invention is to provide a system and a method for graphical resources management, and a computer program product with an application for graphical resources management, which may manage the graphical resources in a structured manner, and thus enables efficient management of graphical resources.

Another objective of the invention is to provide a system and a method for graphical resources management, and a computer program product with an application for graphical resources management, which allows data processing and analysis to be performed on the graphical items generated from graphical resources, and allows a user to manually or automatically edit, sort and correlate the graphical items in a graphical data structure. This is thereby to manage the graphical resources in a systematic manner.

The other objective of the invention is to provide a system and a method for graphical resources management, and a computer program product with an application for graphical resources management, which facilitates the users' logical thinking and memorization, and allow the user to efficiently visualize graphical information.

For the objectives said above and for other objectives, the invention provides a system for graphical resources management including: an importing module for importing at least one graphical resource; a capturing module for capturing a plurality of groups of pixels from the graphical resource to generate a plurality of graphical items; a correlating module for generation and editing of at least one associated attribute to define relationships between the plurality of graphical items; a database for storing the plurality of graphical items and the associated attribute; and a generating module for generating a graphical data structure according to the associated attributes to demonstrate the relationships between the plurality of graphical items.

Optionally, for the system for graphical resources management said above, wherein further including a rule module for defining at least one demonstration rule by which the relationships between the plurality of graphical items are demonstrated.

Optionally, for the system for graphical resources management said above, wherein further including a camera module for capturing an image to obtain the graphical resource for import by the importing module.

Optionally, for the system for graphical resources management said above, wherein further including an analysis unit for analyzing at least one graphical feature in the graphical resource to generate the groups of pixels for capture by the capturing module, or to allow the correlating module to generate or edit the associated attributes.

Optionally, for the system for graphical resources management said above, wherein further including a selection unit for selecting at least one graphical feature in the graphical resource to generate the groups of pixels for capture by the capturing module or to allow the correlating module to generate or edit the associated attributes.

Optionally, for the system for graphical resources management said above, wherein further including a tag module for tagging each of the graphical items with identification information, wherein the database further stores the identification information.

Optionally, for the system for graphical resources management said above, wherein the tag module includes a recognition unit for automatic recognition of at least one graphical feature in each of the graphical items to generate associated identification information.

Optionally, for the system for graphical resources management said above, wherein further including a searching module for allowing a search criterion to be inputted and searching from the database a graphical item tagged with identification information matching the search criterion and/or a graphical item with graphical features matching the search criterion.

Optionally, for the system for graphical resources management said above, wherein the correlating module includes a touch panel displaying the plurality of graphical items, for allowing the plurality of graphical items to be dragged/selected for edit of the associated attributes.

Optionally, for the system for graphical resources management said above, wherein the plurality of graphical items include first, second, and third layer graphical items, wherein first level relationships may exist between the first layer and second layer graphical items, and second level relationships may exist between the second layer and third layer graphical items; the generating module further generates pictorial note page for demonstrating the first level relationships and/or the second level relationships, wherein when the first level relationships of an item being demonstrated, the pictorial note page shows the first and second layer graphical items correlated to the first layer graphical items; when the second level relationships of an item being demonstrated, the pictorial note page shows the second and third layer graphical items correlated to the second layer graphical items; when both the first and second level relationships of an item being demonstrated, the pictorial note page shows the first, second and third layer graphical items associated with the item.

Optionally, for the system for graphical resources management said above, wherein the plurality of graphical items include first, second, and third layer graphical items, wherein first level relationships exist between the first layer and second layer graphical items, and second level relationships exist between the second layer and third layer graphical items; the generating module further generates flashcards, each with a front side card face and a back side card face for demonstrating the first level relationships or the second level relationships, wherein when the first level relationships related to an item being demonstrated, the front side card face shows the first layer graphical items, and the back side card face shows the second layer graphical items correlated to the first layer graphical items; when the second level relationships of an item being demonstrated, the front side card face shows the second layer graphical items, and the back side card face shows the third layer graphical items correlated to the second layer graphical items.

Furthermore, the invention further provides a method for graphical resources management including the steps of: importing at least one graphical resource; capturing a plurality of groups of pixels from the graphical resource to generate a plurality of graphical items; generating or editing at least one associated attribute to define relationships between the plurality of graphical items; storing the plurality of graphical items and the associated attributes; and generating a graphical data structure according to the associated attributes to demonstrate the relationships between the plurality of graphical items.

Optionally, for the method for graphical resources management said above, wherein further including the steps of: defining at least one demonstration rule by which the relationships between the plurality of graphical items are demonstrated; capturing an image to obtain the graphical resource; tagging each of the graphical items with identification information and storing the identification information; recognizing at least one graphical feature in each of the graphical items to generate the identification information; and inputting search criteria and searching a graphical items tagged with identification information matching the search criteria.

Optionally, for the method for graphical resources management said above, wherein the step of capturing a plurality of groups of pixels further includes analyzing at least one graphical feature in the graphical resource or selecting at least one graphical feature in the graphical resource to generate the groups of pixels for capture or allow the associated attributes to be edited.

Optionally, for the method for graphical resources management said above, wherein the step of editing at least one associated attribute further includes displaying the plurality of graphical items and allowing the plurality of graphical items to be dragged/selected to edit associated attributes.

Optionally, for the method for graphical resources management said above, wherein the plurality of graphical items include a plurality of first, second, and third layer graphical items, and the step of editing at least one associated attribute edits first level relationships between the first layer graphical items and second layer graphical items, and second level relationships between the second layer graphical items and third layer graphical items; the method further includes a step of generating pictorial note pages for demonstrating the first level relationships and/or second level relationships, wherein when the first level relationships related to an item being demonstrated, the pictorial note page shows the first and second layer graphical items correlated to the first layer graphical items; when the second level relationships related to an item being demonstrated, the pictorial note page shows the second and third layer graphical items correlated to the second layer items; when both the first and second level relationships related to an item being demonstrated, the pictorial note page shows the first, second and third layer graphical items associated with the item.

Optionally, for the method for graphical resources management said above, wherein the plurality of graphical items include a plurality of first, second, and third layer graphical items, and the step of editing at least one associated attribute generates or edits first level relationships between the first layer graphical items and second layer graphical items, and second level relationships between the second layer graphical items and the third layer graphical items; the method further includes a step of generating flashcards, each with a front side card face and a back side card face for demonstrating the first level relationships or the second level relationships, wherein when the first level relationships related to an item being demonstrated, the front side card face shows the first layer graphical items, and the back side card face shows the second layer graphical items correlated to the first layer graphical items; when the second level relationships of an item being demonstrated, the front side card face shows the second layer graphical items, and the back side card face shows the third layer graphical items correlated to the second layer graphical items.

Moreover, the invention further provides a computer program product with an application for graphical resources management, wherein when the application for graphical resources management is loaded to the computer program product and executed, it completes the steps of the method for graphical resources management said above, Compared to the conventional technology, a primary objective of the invention is to provide a system and a method for graphical resources management, and a computer program product with an application for graphical resources management, which may capture groups of pixels from imported graphical resources to form graphical items, edit relationships between the graphical items, and generate a graphical data structure that demonstrates the relationships between the graphical items, so as to manage the graphical resources in a structured manner. Moreover, the invention further allows data processing and analysis to be performed on the imported graphical resources to form graphical items, and allows a user to manually or automatically edit, sort and correlate the graphical items in a graphical data structure. This is thereby to manage the graphical resources in a systematic manner, facilitates logical thinking and memorization for the user, and allow the user to efficiently visualize graphical information.

BRIEF DESCRIPTION OF THE DRAWINGS

The above and other aspects, features and other advantages of the present invention will be more clearly understood from the following detailed description taken in conjunction with the accompanying drawings, in which:

FIGS. 3-01, 3-02, 3-03, 3-04, 3-05, 3-06, 3-07, 3-07A, 3-08, 3-09, 3-10, 3-11, 3-11A, 3-11B, 3-11C, 3-12, 3-13, 3-13A, 3-13B, 3-14A, 3-14B, 3-14C, 3-14D, 3-15, 3-16 and 3-17 are schematic diagrams showing operations of a series of embodiments according to the invention.

DETAILED DESCRIPTION OF THE PREFERRED EMBODIMENT

Figure 1A:
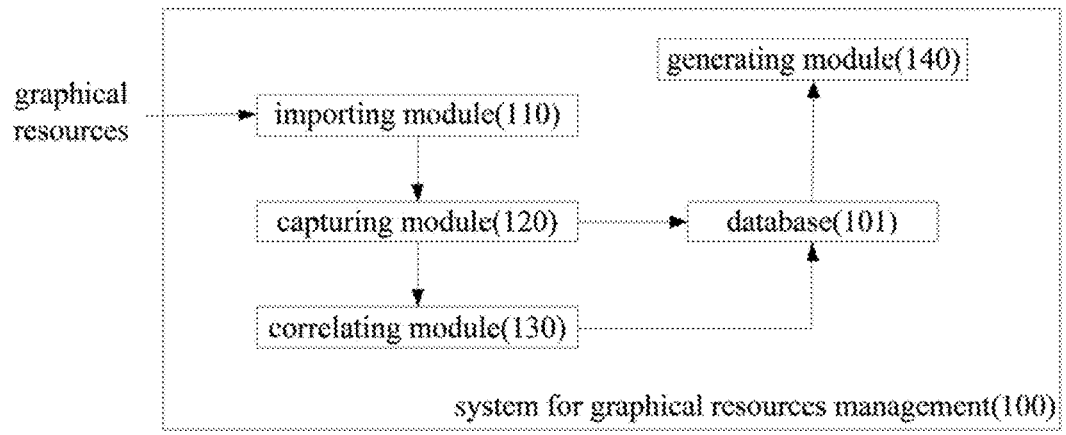
FIG. 1A is a basic structural schematic diagram of a system for graphical resources management according to the invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

FIG. 1A is a basic structural schematic diagram of a system for graphical resources management according to the invention. The system for graphical resources management 100 is applied to an computing device (not shown) such as smartphone, tablet computer, notebook computer, desktop computer, and so on, so as to edit, sort and correlate associated graphical resources in a structured manner. As shown, the system for graphical resources management 100 includes an importing module 110, a capturing module 120, a correlating module 130, a generating module 140 and a database 101.

Figure 2:
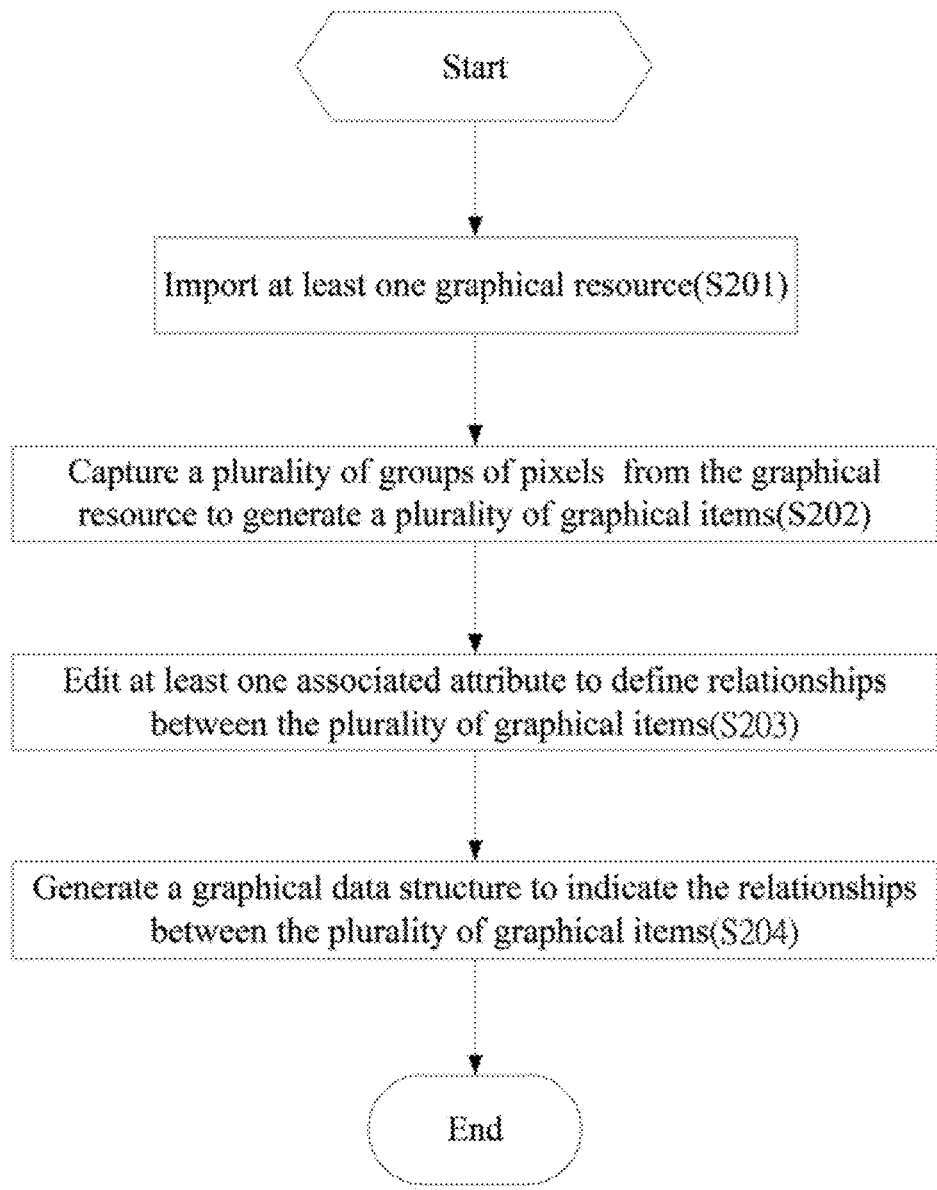
FIG. 2 is a basic flowchart of a method for graphical resources management according to the invention.
Figures 1, 3:
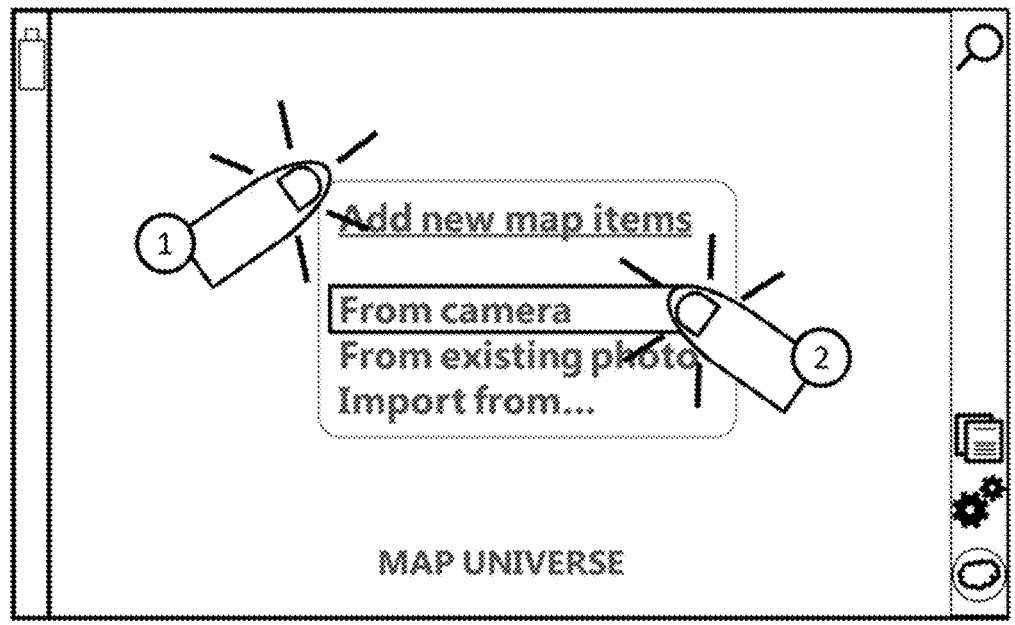
Figures 2, 3:
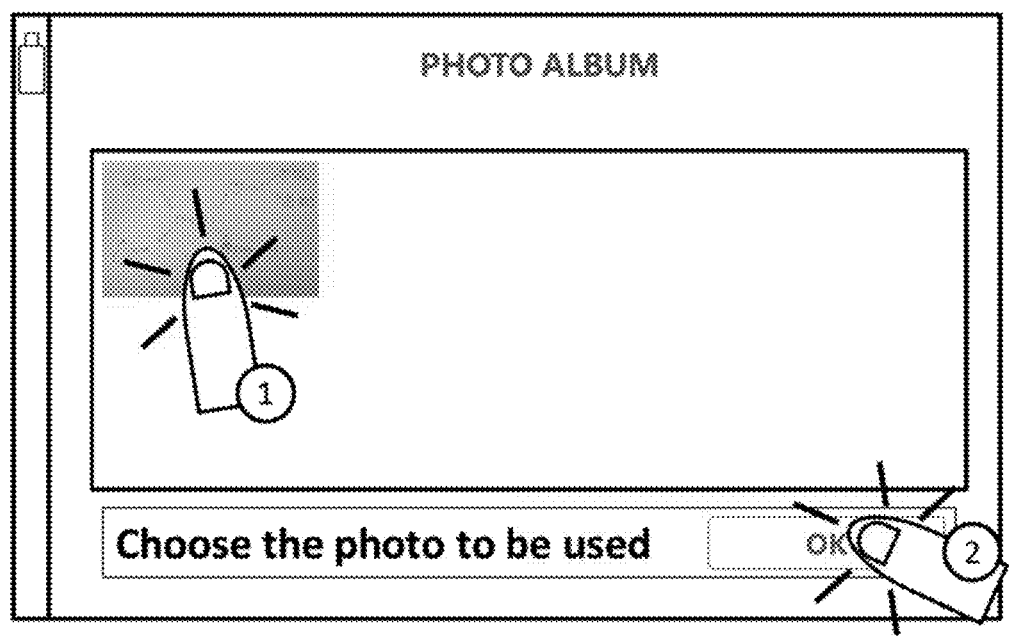
Figure 3:
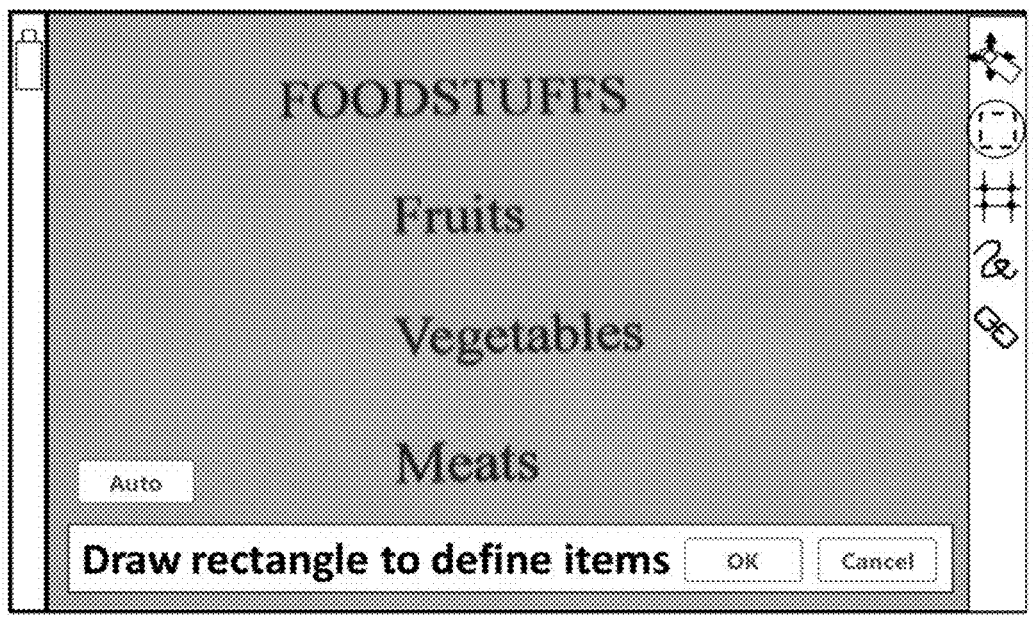

The importing module 110 is used to import at least one graphical resource. In this embodiment, the graphical resource can be a static or dynamic graphical resource, (e.g. photo, image, animation, video, etc). Also referring to FIG. 3-01, it schematically shows an operation interface for importing the graphical resource as provided by the system 100 of the invention. As shown in FIG. 3-01, the importing module 110 of the invention provides a user several ways to import the graphical resource, including "import from camera" mode, "import from existing photo" mode and "import from others" mode. Particularly, the system for graphical resources management 100 according to the invention further includes a camera module 150 (shown in FIG. 1B), which could access optical sensors such as a built-in camera function module of a mobile phone, that could capture static and/or dynamic graphical resources to provide the graphical resource for import by the importing module 110. When the user selects the "import from camera" option from the operation interface shown in FIG. 3-01, the system for graphical resources management 100 activates the camera module 150 to allow the user to capture a image and generate a corresponding graphical resource for import by the importing module 110. Further referring to FIG. 3-01, when the user selects the "import from existing photo" option from the operation interface, the system 100 allows the user to choose a graphical resource from a storage device (as shown in FIG. 3-02), wherein the graphical resource can be a static or dynamic graphical resource. If the user chooses a dynamic graphical resource, the system 100 further allows the user to select a certain clip from the dynamic image and convert the clip into one or more static graphical resources for being import by the importing module 110. Moreover, the "import from others" mode in FIG. 3-01 allows, for example, the system 100 to be connected to a third party application installed on the mobile phone to retrieve an associated graphical resource from the third party application.

The capturing module 120 is used to capture a plurality of groups of pixels from the imported graphical resource to form a plurality of graphical items. In the embodiment of the invention, when the graphical resource is imported by the importing module 110, the system 100 displays an operation interface for the user to manually or automatically capture a plurality of groups of pixels from the graphical resource.

Figure 1B:
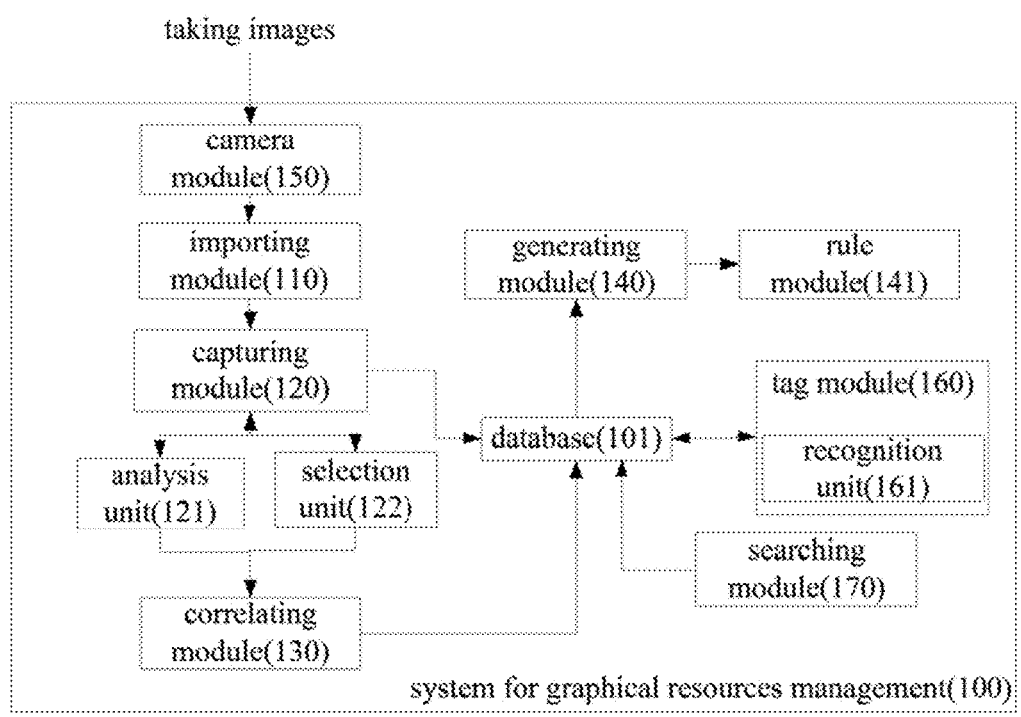
FIG. 1B is a schematic diagram of the system for graphical resources management according to a preferred embodiment of the invention.
Figures 3, 4:
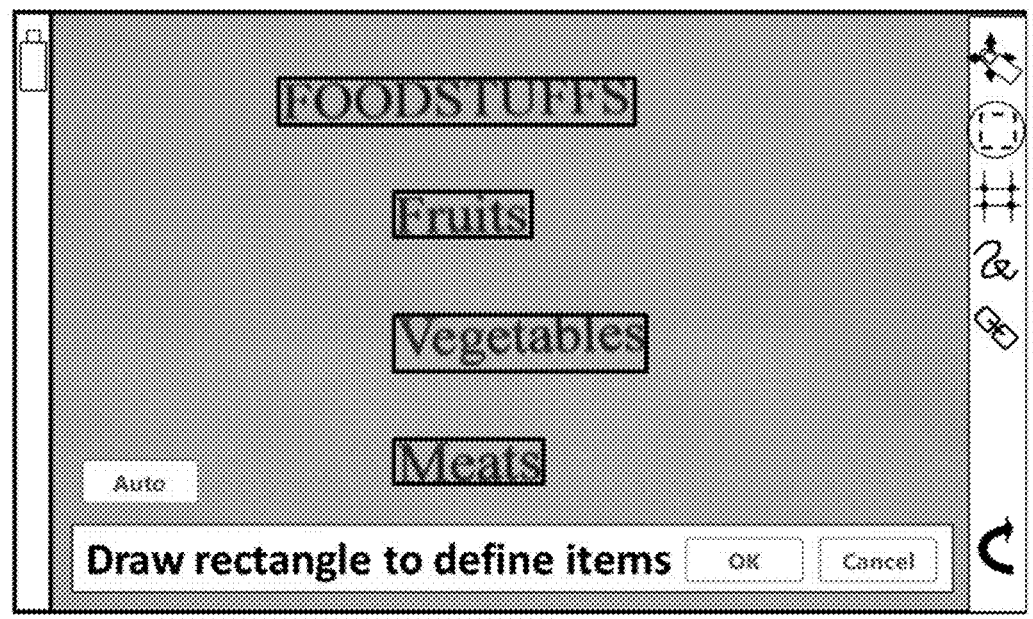

In an embodiment, as shown in FIG. 1B, the system for graphical resources management 100 further includes an analysis unit 121 and a selection unit 122. The analysis unit 121 is used to analyze at least one outstanding graphical feature included in the graphical resource so as to automatically generate groups of pixels for capture by the capturing module 120. Particularly, as shown in FIG. 3-03, when the user clicks on "Auto" function button in the left-bottom corner of the operation interface, the analysis unit 121 analyzes outstanding graphical features, such as "foodstuffs", "fruits", "vegetables", "meats" (as shown in FIG. 3-04) included in the graphical resource, so as to automatically generate the groups of pixels for capture by the capturing module 120. Outstanding graphical features mentioned above could include texts appearing in the graphical resource, a face image, or pixels with significant contrast to the background or pixels forming specific shapes that can be recognized by algorithms. FIG. 3-17 shows the text, the face image included as outstanding graphical features in the graphical resource.

Figures 3, 4, 5:
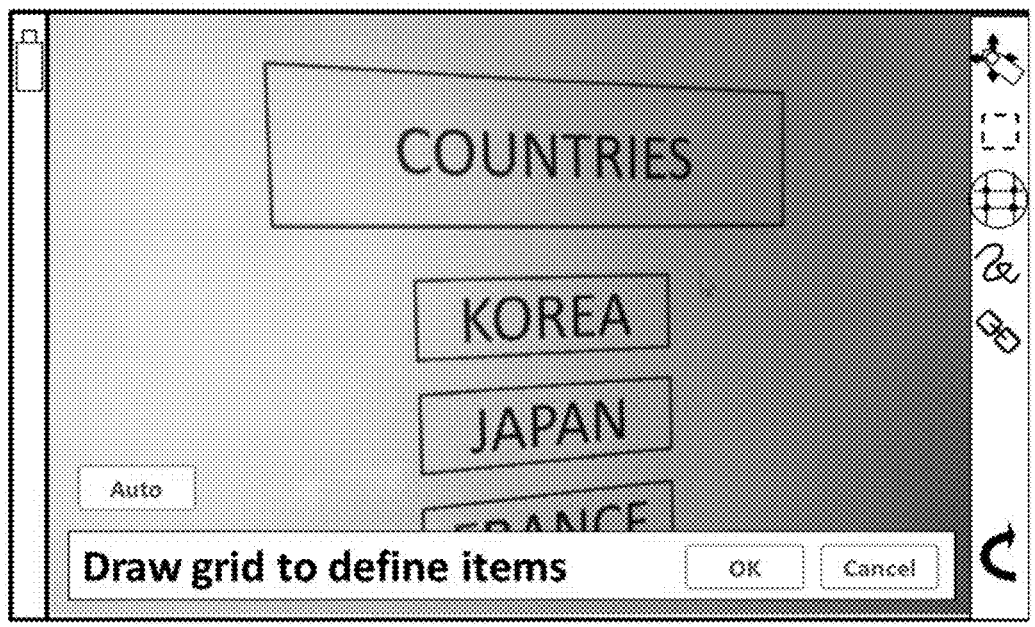
Figures 3, 4, 5, 6:
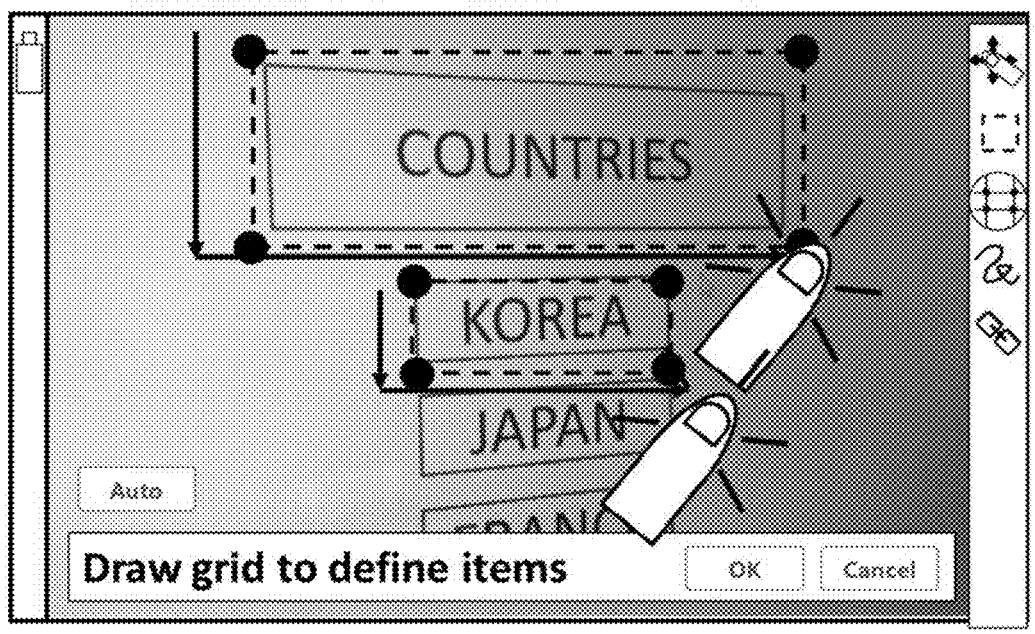
Figures 3, 4, 5, 6, 7:
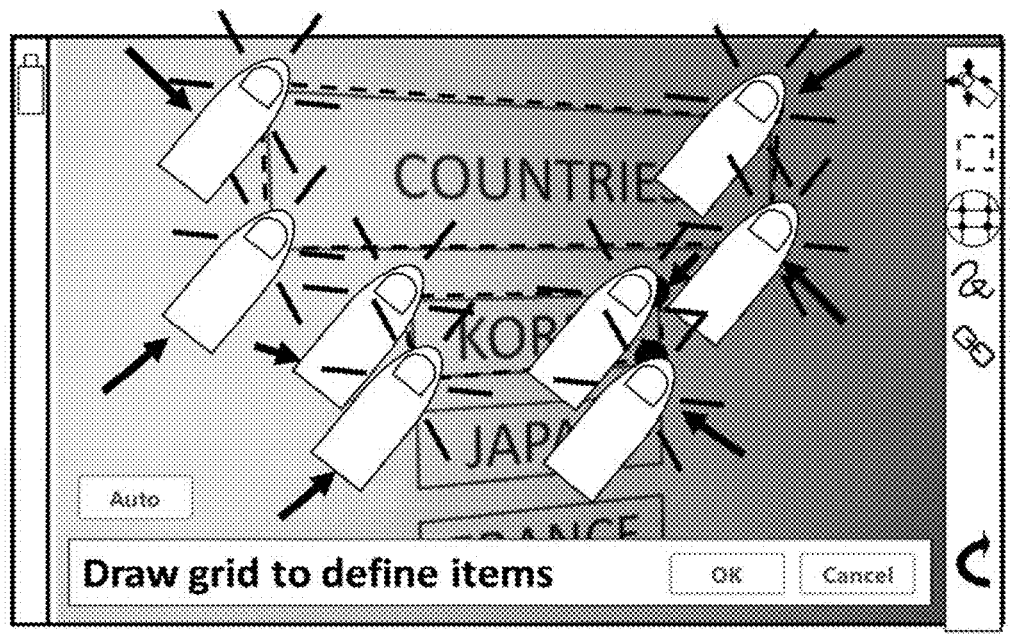
Figures 3, 4, 5, 6, 7, 7A:
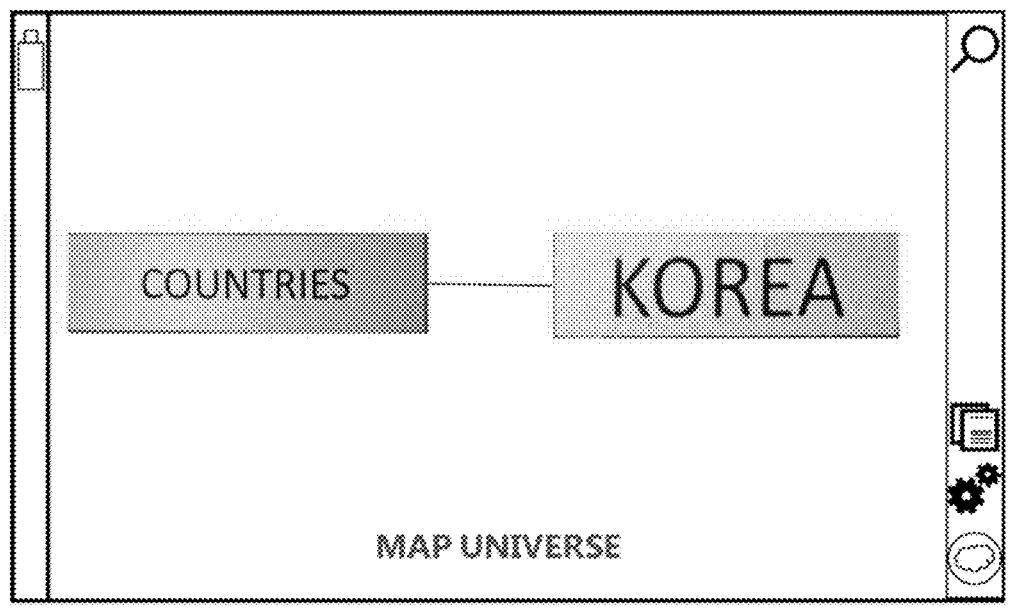
Figures 3, 4, 5, 6, 7, 8:
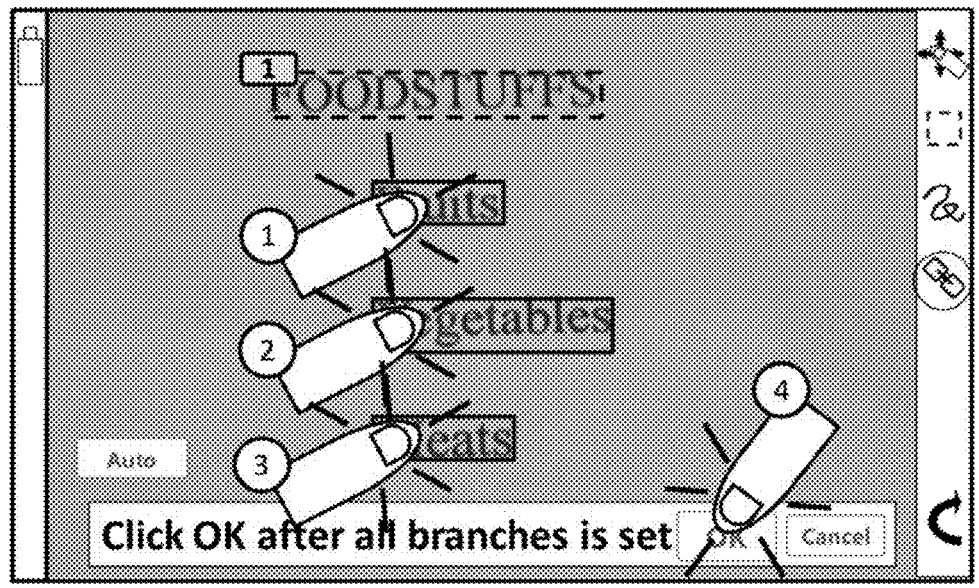
Figures 3, 4, 5, 6, 7, 8, 9:
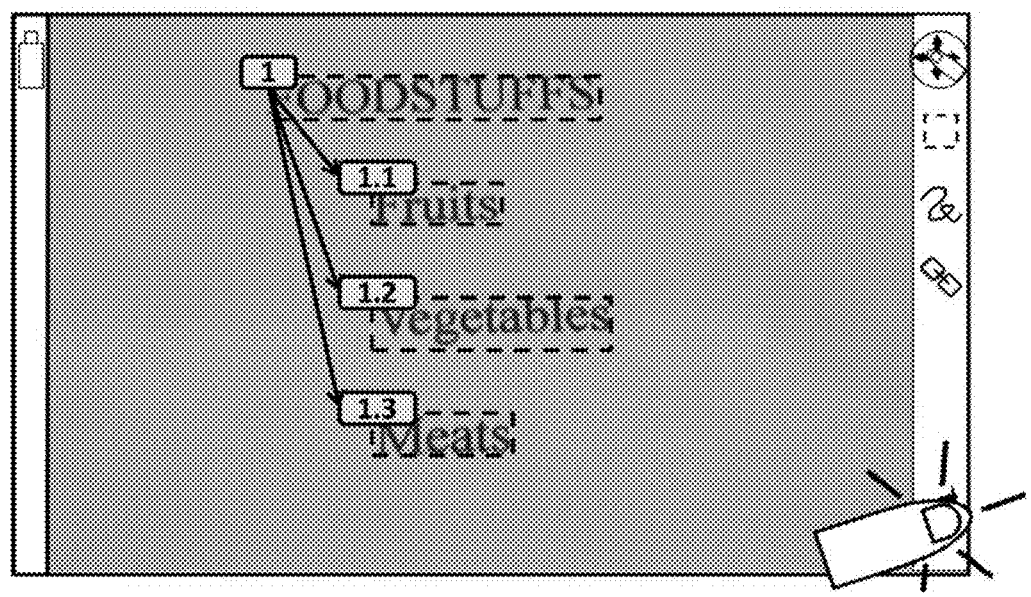
Figures 3, 4, 5, 6, 7, 8, 9, 10:
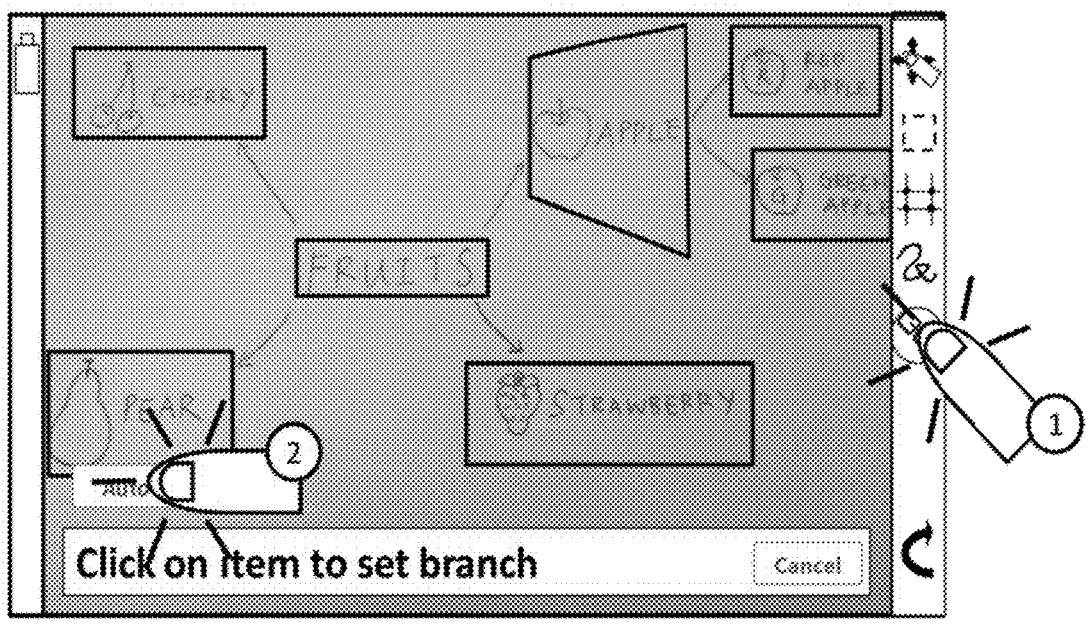
Figures 3, 4, 5, 6, 7, 8, 9, 10, 11:
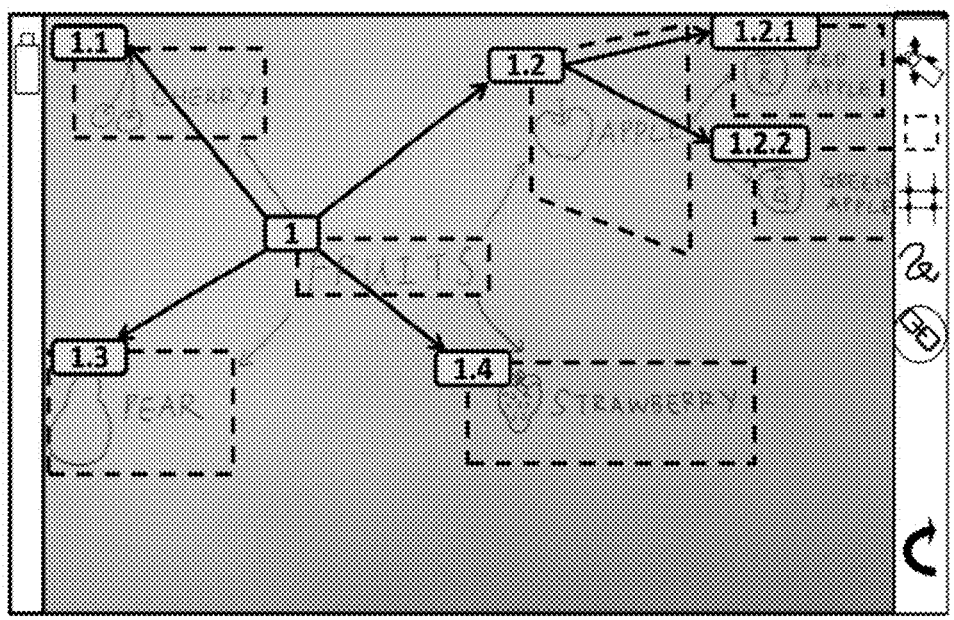
Figures 3, 4, 5, 6, 7, 8, 9, 10, 11, 11A:
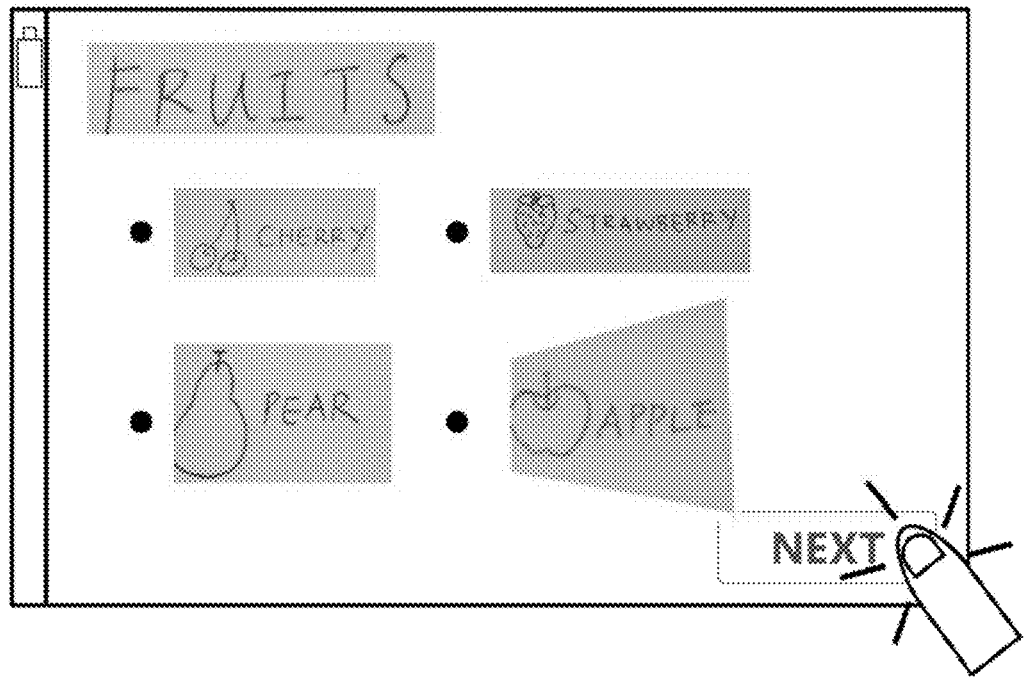
Figures 3, 4, 5, 6, 7, 8, 9, 10, 11, 11B:
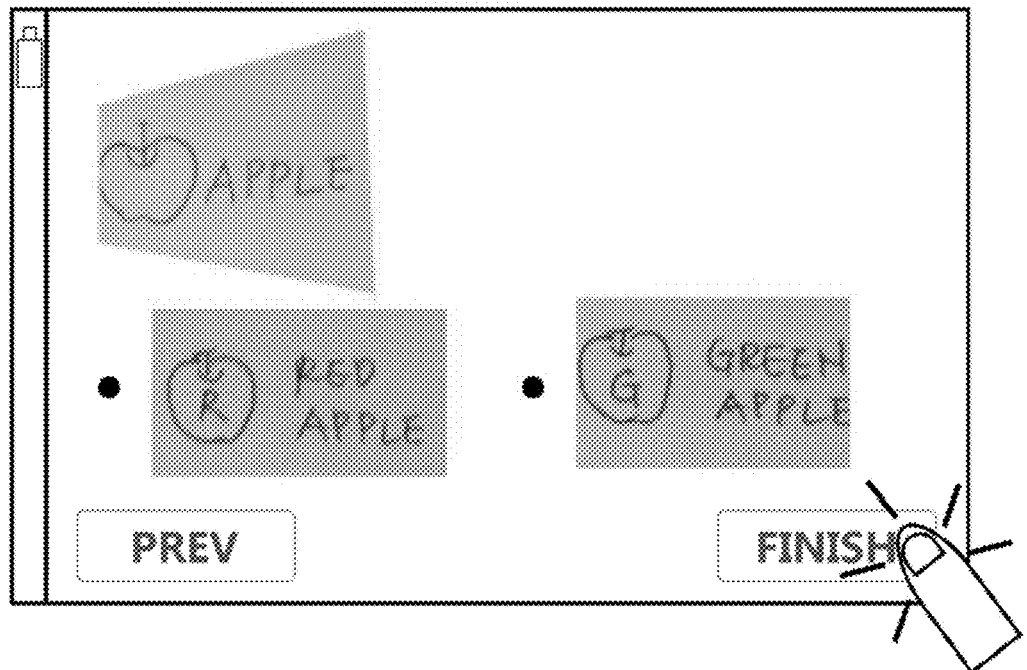
Figures 3, 4, 5, 6, 7, 8, 9, 10, 11, 11C:
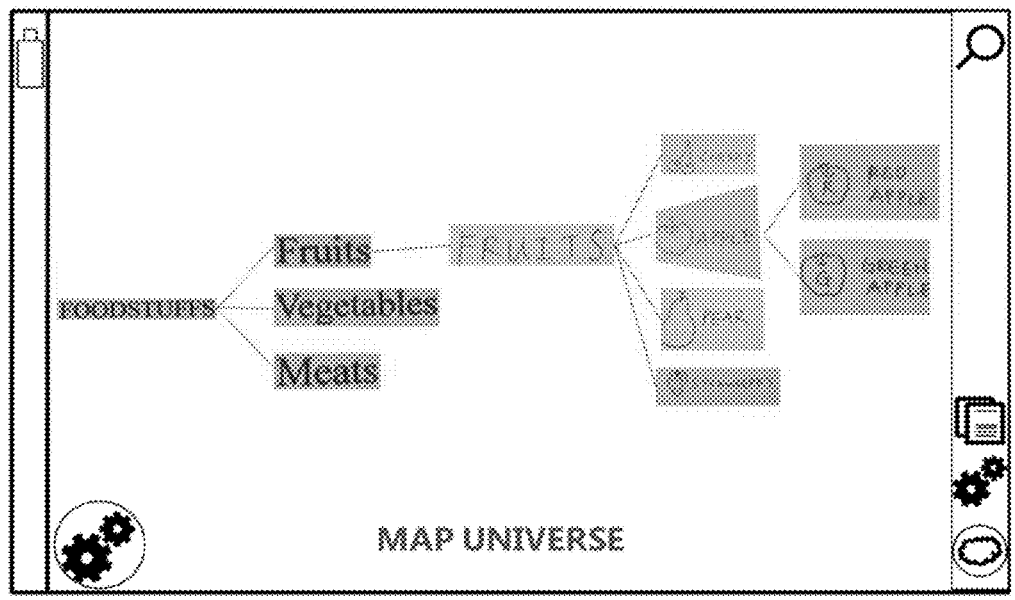
Figures 3, 4, 5, 6, 7, 8, 9, 10, 11, 12:
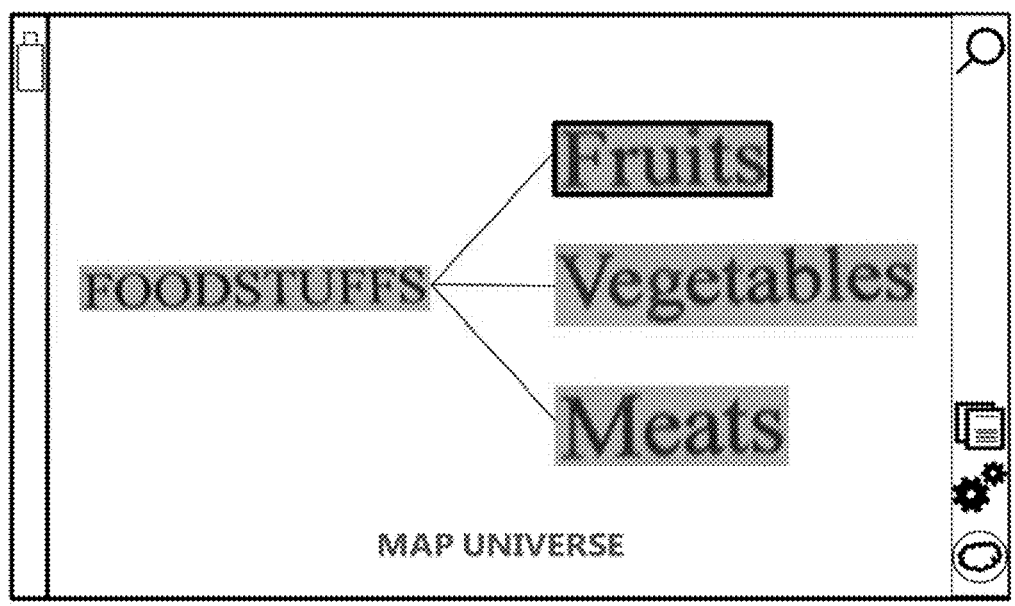
Figures 3, 4, 5, 6, 7, 8, 9, 10, 11, 12, 13:
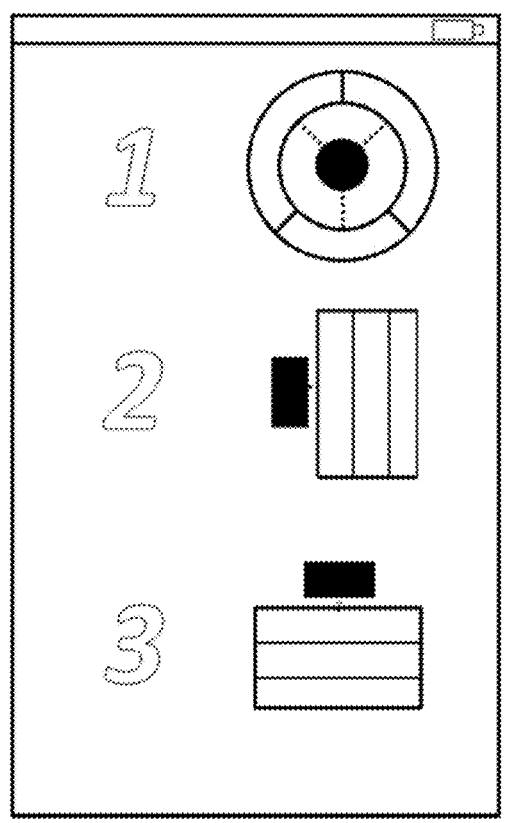
Figures 3, 4, 5, 6, 7, 8, 9, 10, 11, 12, 13, 13A:
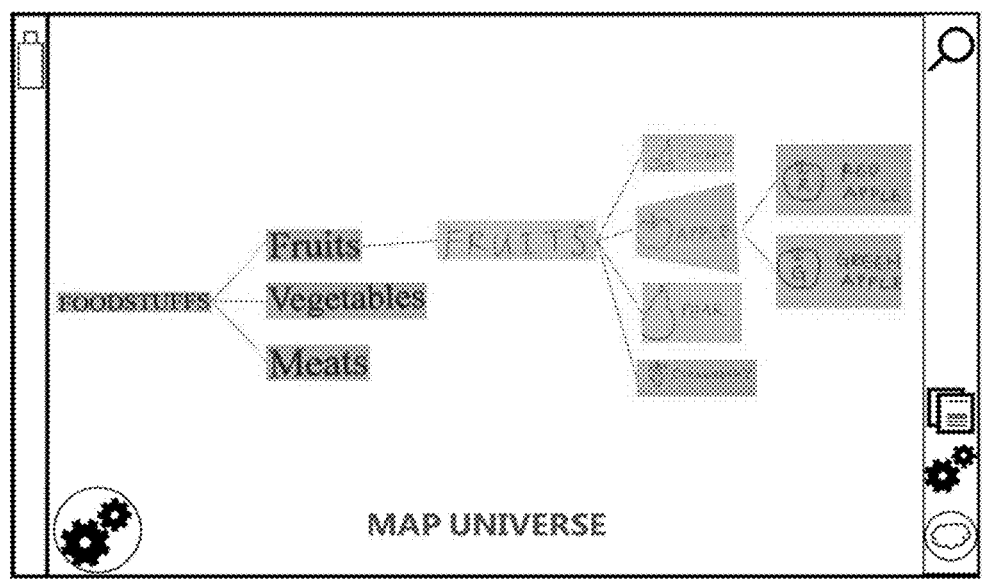
Figures 3, 4, 5, 6, 7, 8, 9, 10, 11, 12, 13, 13B:
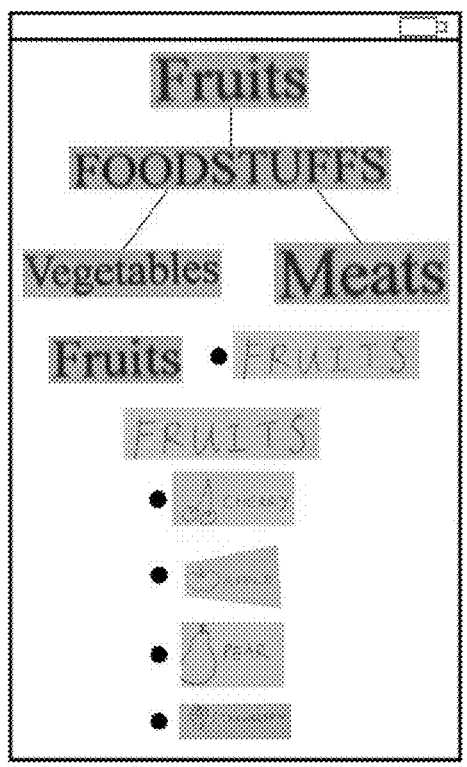
Figures 3, 4, 5, 6, 7, 8, 9, 10, 11, 12, 13, 14, 14A:
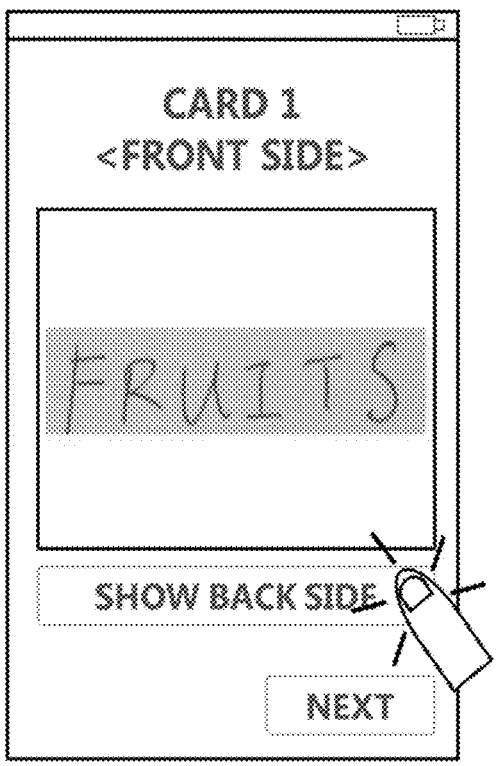
Figures 3, 4, 5, 6, 7, 8, 9, 10, 11, 12, 13, 14, 14B:
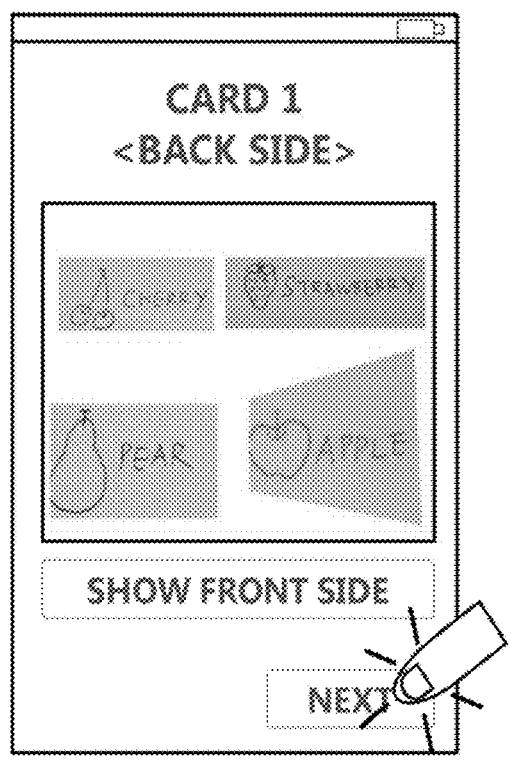
Figures 3, 4, 5, 6, 7, 8, 9, 10, 11, 12, 13, 14, 14C:
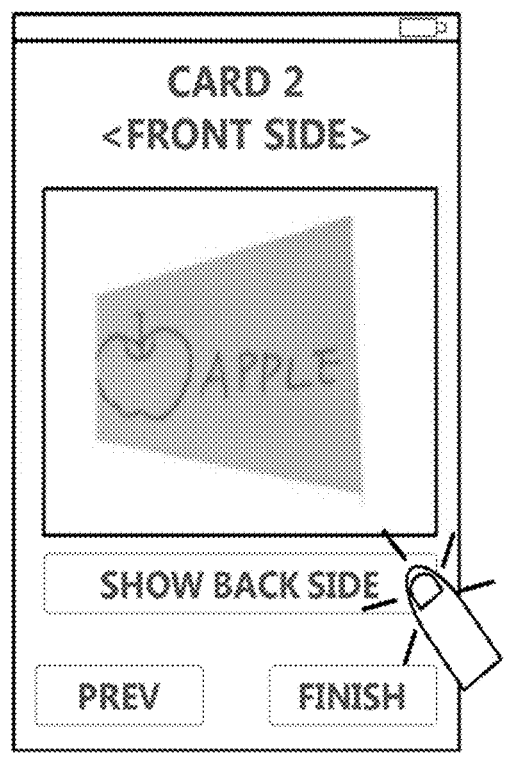
Figures 3, 4, 5, 6, 7, 8, 9, 10, 11, 12, 13, 14, 14D:
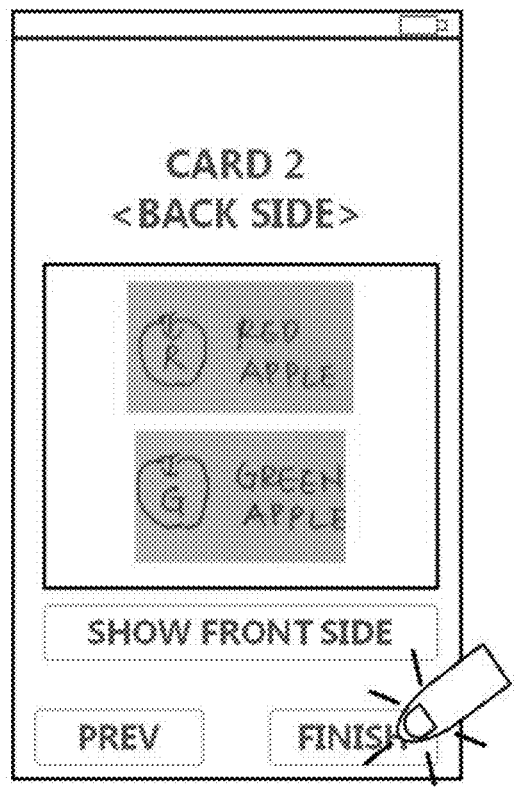
Figures 3, 4, 5, 6, 7, 8, 9, 10, 11, 12, 13, 14, 15:
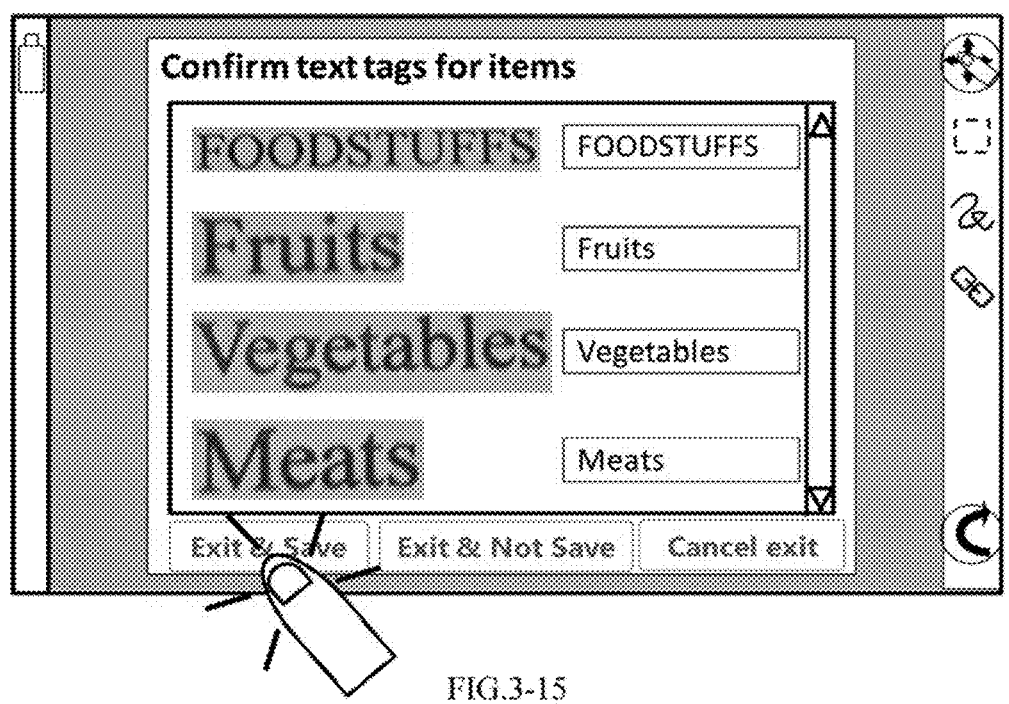
Figures 3, 4, 5, 6, 7, 8, 9, 10, 11, 12, 13, 14, 15, 16:
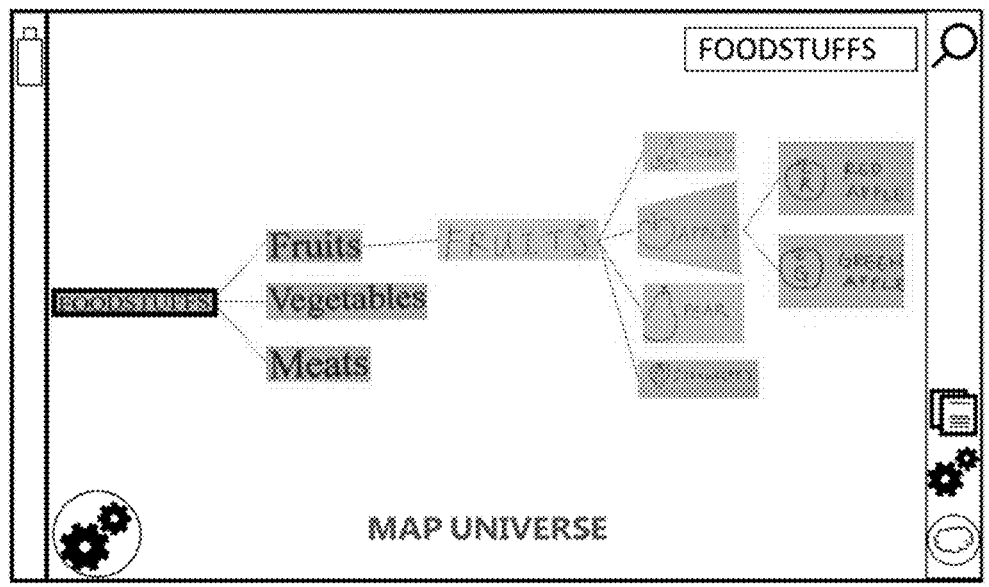
Figures 3, 4, 5, 6, 7, 8, 9, 10, 11, 12, 13, 14, 15, 16, 17:
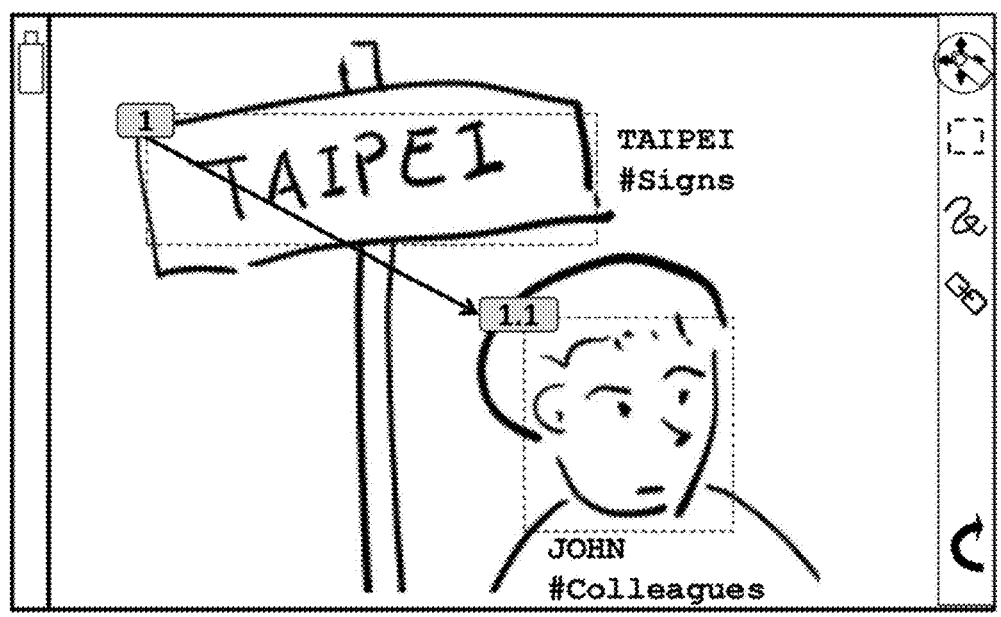

In another embodiment, as shown in FIG. 3-05, when the user clicks on "manual capture" function button from a tool bar on the right side of the operation interface, the selection unit 122 allows the user to manually draw a grid enclosing at least one graphical feature (such as "COUNTRIES", "KOREA", "JAPAN" shown in FIG. 3-06) included in the graphical resource. Moreover, the selection unit 122 also allows the user to manually modify the graphical features that are automatically analyzed by the analysis unit 121, as shown in FIG. 3-07, so as to generate the groups of pixels for capture by the capturing module 120. The "manual capture" function further allows corrections, including distortion correction and/or color correction, to be performed on the groups of pixels captured by the capturing module 120 to thereby improve their quality of display, as shown in FIG. 3-07A.

The correlating module 130 is used for the users to generate or edit at least one associated attribute to define master-slave relationships between the plurality of graphical items. In an embodiment, the correlating module 130 includes a touch panel for displaying the plurality of graphical items. The touch panel allows the users to generate or edit the associated attributes by dragging or selecting the plurality of graphical items or by other operations.

In an embodiment, the plurality of graphical items may include first and second layer graphical items. As shown in FIG. 3-08, the first layer graphical item includes "foodstuffs", and the second layer graphical items includes "fruits", "vegetables", and "meats". In the operation interface provided in FIG. 3-08, the user may drag or select the first and second layer graphical items to edit the master-slave relationships therebetween. In this embodiment, the first and second layer graphical items are edited as such to have a direct master-slave relationship therebetween, which means that "foodstuffs" serves as a first-layer node, and "fruits", "vegetables", "meats" serve as second-layer nodes subordinate to "foodstuffs", as shown in FIG. 3-09.

In another embodiment, the plurality of graphical items may include first, second, and third layer graphical items. As shown in FIG. 3-10, the first layer graphical items includes "fruits", the second layer graphical items includes "cherry", "apple", "pear", "strawberry", and the third layer graphical items includes "red apple", "green apple". In the operation interface provided in FIG. 3-10, the user may click on "Auto" function button in the left-bottom corner, allowing the analysis unit 121 to automatically analyze the relationships between the graphical items and to establish first level master-slave relationships between the first layer and second layer graphical items and second level master-slave relationships between the second layer and third layer graphical items. Particularly, "fruits" serves as a first-layer node, "cherry", "apple", "pear", "strawberry" serve as second-layer nodes subordinate to "fruits", and "red apple", "green apple" serve as third-layer nodes subordinate to "apple", as shown in FIG. 3-11. Moreover in the invention, the correlating module 130 not only defines master-slave relationships between the graphical items generated by the capturing module 120, but also may directly edit associated attributes for the graphical features generated by the analysis unit 121 and the selection unit 122.

It should be noted that, the correlating module 130 of the invention further may expand the master-slave relationships between the graphical items, for example, the second-layer node "fruits" in FIG. 3-09 can further be correlated with the first-layer node in FIG. 3-11 to form a graphical data structure having four layers of nodes as shown in FIG. 3-11C.

The database 101 is used to store various data generated by the system 100, such as the plurality of graphical items generated by the capturing module 120 and the associated attributes defined by the correlating module 130, generating module 140, and tag module 160. The database 101 can be a cloud database.

The generating module 140 is used to generate a graphical data structure (such as a mind map) according to the associated attributes defined by the correlating module 130 so as to demonstrate the master-slave relationships between the plurality of graphical items as shown in FIGS. 3-11 and 3-12. In the invention, the system 100 further includes a rule module 141 for defining at least one demonstration rule, where the rules can be user-defined. The master-slave relationships between the plurality of graphical items are demonstrated according to the demonstration rule, which can be defined by the user, for example, FIG. 3-13 shows three rules of layout of graphics: radial, landscape and portrait orientations, to form different layouts such as those shown in FIGS. 3-13A and 3-13B. It should be understood that, the invention may generate but is not limited to the layouts shown in FIGS. 3-13A and 3-13B. Layouts such as a fishbone structure are also applicable.

In an embodiment, the generating module 140 is further used to generate a pictorial note, such as a document or slideshow, to demonstrate first level master-slave relationships and/or second level master-slave relationships. Particularly, the user may choose a range of the master-slave relationships to be demonstrated. An example could be seen in FIG. 3-11, when the user choose to demonstrate the first level master-slave relationships related to an item, the system 100 generates a pictorial note page as shown in FIG. 3-11A, which shows the first layer graphical item "fruits", the second layer graphical items "cherry", "strawberry", "pear", "apple", and their corresponding first level master-slave relationship. When the user choose to demonstrate the second level master-slave relationships related to an item, the system 100 generates a pictorial note page as shown in FIG. 3-11B, which shows the second layer graphical item "apple", the third layer graphical items "red apple", "green apple", and their corresponding second level master-slave relationship. If the user needs to demonstrate both the first and second master-slave relationships, the system 100 displays a pictorial note page as shown in FIG. 3-11, which shows the first layer graphical item "fruits", the second layer graphical item "cherry", "strawberry", "pear", "apple", the third layer graphical item "red apple", "green apple", and their corresponding first and second level master-slave relationships. It should be noted that, the pictorial note pages of FIGS. 3-11A and 3-11B are associated with each other, that is, when the user clicks on "NEXT" button in the pictorial note page of the first level master-slave relationship demonstrated in FIG. 3-11A, the system 100 then turns to the pictorial note page of the second level master-slave relationships indicated in FIG. 3-11B. Alternatively, if the user clicks on "PREV" button in the pictorial note page of the second master-slave relationship indicated in FIG. 3-11B, the system 100 then turns to the pictorial note page of the first master-slave relationships indicated in FIG. 3-11A. Moreover, the generating module 140 may also generate pictorial note pages according to the demonstration rule defined by the user from the rule module 141.

In another embodiment, the generating module 140 is further used to generate a flashcard with a front side card face and a back side card face, that demonstrates first level or second level master-slave relationships. For example of FIG. 3-11, when a first level master-slave relationship is demonstrated, the front side card face shows the first layer graphical item, which is "fruits" (as shown in FIGS. 3-14A), and the back side card face shows the second layer graphical items, including "cherry", "strawberry", "pear", "apple" (as shown in FIG. 3-14B); when the second level master-slave relationships are demonstrated, the front side card face shows the second layer graphical item, which is "apple" (as shown in FIGS. 3-14C), and the back side card face shows the third layer graphical items, including "red apple", "green apple" (as shown in FIG. 3-14D). Moreover, the generating module 140 may also generate the pictorial note pages according to the demonstration rule defined by the user from the rule module 141.

As shown in FIG. 1B, in the embodiment of the invention, the system for graphical resources management 100 further includes a tag module 160 for tagging each of the graphical items with identification information and storing the identification information in the database 101 (as shown in FIG. 3-15). In an embodiment, the tag module 160 further includes a recognition unit 161 for recognizing at least one graphical feature in each of the graphical items to generate the identification information, such that the graphical items can be automatically tagged with the identification information. It should be noted that, the invention is not limited to this way of tagging, but also allows manual editing to tag the graphical items with the identification information.

The system for graphical resources management 100 further includes a searching module 170 for allowing the user to input a plurality of search criteria and accordingly searching from the database 101 a plurality of graphical items with identification information tagged by the tag module 160 matching the search criteria, or have graphical features matching the search criteria. For example, if the user inputs "foodstuffs" as a search criterion, the searching module 170 accordingly searches from the database 101 a graphical item matching "foodstuffs". Referring to FIG. 3-16, in another embodiment, the searching module 170 searches from the database 101 not only a graphical item matching "foodstuffs" but also next-layer graphical items subordinate to "foodstuffs", that is, "fruits", "vegetables", "meats".

FIG. 2 shows a basic flowchart of a method for graphical resources management according to the invention. Referring to FIG. 2, first in step S201, at least one graphical resource is imported, particularly a static or dynamic graphical resource such as photo, picture, animation, video and so on. The invention provides a user several ways to import the graphical resource, including "import from camera" mode, "import from existing photo" mode and "import from others" mode. The "import from camera" mode refers to acquiring a graphical resource by capturing an image from an optical sensor and importing the graphical resource (as shown in FIG. 3-01); the "import from existing photo" mode refers to choosing a graphical resource from a storage device and importing the graphical resource (as shown in FIG. 3-02); the "import from others" mode refers to connecting to a third party application installed on the computing device to retrieve an associated graphical resource from the third party application and importing the graphical resource. Then, step S202 is executed.

In step S202, a plurality of groups of pixels are captured from the graphical resource to generate a plurality of graphical items. Particularly, the step of capturing groups of pixels further includes analyzing at least one outstanding graphical feature in the graphical resource to generate groups of pixels for capture, such that the system automatically captures groups of pixels from the graphical resource (as shown in FIG. 3-04). Outstanding graphical features may include texts appearing in the graphical resource, a face image, or pixels with significant contrast to the background, or pixels forming specific shapes that can be identified by algorithms. Moreover, the invention also allows the user to manually select at least one graphical feature from the graphical resource to form groups of pixels for capture (as shown in FIGS. 3-06 and 3-07). Then, step S203 is executed.

In step S203, at least one associated attribute is edited to define master-slave relationships between the plurality of graphical items, and the plurality of graphical items and the master-slave relationships are stored. In particular, the invention provides a touch operation interface displaying the plurality of graphical items, for allowing the user to drag or choose the plurality of graphical items from the touch operation interface and edit the associated attributes. For example, the plurality of graphical items may include first, second, and third layer graphical items. As shown in FIG. 3-10, the first layer graphical item includes "fruits", the second layer graphical items include "cherry", "apple", "pear", "strawberry", and the third layer graphical items include "red apple", "green apple". The step of editing the associated attributes refers to creating/editing first level master-slave relationships between the first layer and second layer graphical items, and creating/editing second level master-slave relationships between the second and third layer graphical items, wherein "fruits" serves as a first-layer node, "cherry", "apple", "pear", "strawberry" serve as second-layer nodes subordinate to "fruits", and "red apple", "green apple" serve as third-layer nodes subordinate to "apple" (as shown in FIG. 3-11). It should be noted that, the step of editing the associated attributes may be performed directly after the step of capturing the graphical feature. Moreover, the invention also automatically analyzes pixels in the graphical resource to establish relationships between the graphical items (as shown in FIGS. 3-10 and 3-11). Then, step S204 is executed.

In step S204, a graphical data structure is generated according to the associated attributes to demonstrate the master-slave relationships between the plurality of graphical items. In particular, the method of the invention further includes a step of defining at least one demonstration rule, for demonstrating the master-slave relationships between the plurality of graphical items according to the demonstration rule. For example, FIG. 3-13 shows three rules of layout of graphics, which however do not set a limitation for the invention, and other layouts such as a fishbone structure are also applicable. Alternatively, the user may define the demonstration rules through the interface shown in FIG. 3-13. Moreover, the method of the invention further includes a step of generating pictorial note pages for demonstrating the first level master-slave relationships and/or the second level master-slave relationships.

In addition, the invention further provides a computer program product with an application for graphical resources management, by which application the steps shown in FIG. 2 are executed.

Therefore, the invention provides a system and a method for graphical resources management, and a computer program product with an application for graphical resources management, which may define and select graphical items included in imported graphical resources, edit associated attributes between the graphical items, and define relationships between the graphical items, so as to generate a graphical data structure that demonstrates relationships between the graphical items and manage the graphical resources in a structured manner, thereby improving the efficiency of graphical resources management. Moreover, the invention further allows data mining to be performed on the imported graphical resources by capturing the graphical items from the graphical resources, and allows a user to edit, sort and correlate the graphical items according to her/his logical thinking. This is thereby to manage the graphical resources in a systematic manner, facilitate the user's logical thinking and memorization, and help the user efficiently visualize graphical information.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. A system for graphical resources management including:

an importing module for importing at least one graphical resource;

a capturing module for capturing a plurality of groups of pixels from the graphical resource to generate a plurality of graphical items;

a correlating module for editing at least one associated attribute to define relationships between the plurality of graphical items;

a database for storing the plurality of graphical items and the associated attributes; and a generating module for generating a graphical data structure according to the associated attributes to demonstrate the relationships between the plurality of graphical items, wherein the plurality of graphical items include first, second, and third layer graphical items, wherein first level relationships may exist between the first and second layer graphical items, and second level relationships may exist between the second and third layer graphical items; the generating module further generates flashcards, each with a front side card face and a back side card face for demonstrating the first level relationships or the second level relationships, wherein when the first level relationships related to an item being demonstrated, the front side card face shows the first layer graphical items, and the back side card face shows the second layer graphical items correlated to the first layer graphical items; when the second level relationships related to an item being demonstrated, the front side card face shows the second layer graphical items, and the back side card face shows the third layer graphical items correlated to the second layer graphical items.

2. The system for graphical resources management according to claim 1, further including a rule module for defining at least one demonstration rule by which the relationships between the plurality of graphical items are demonstrated.

3. The system for graphical resources management according to claim 1, further including a camera module for capturing an image to obtain the graphical resource for import by the importing module.

4. The system for graphical resources management according to claim 1, further including an analysis unit for analyzing at least one graphical feature in the graphical resource to generate the groups of pixels for capture by the capturing module or to allow the correlating module to edit the associated attributes.

5. The system for graphical resources management according to claim 1, further including a selection unit for selecting at least one graphical feature in the graphical resource to generate the groups of pixels for capture by the capturing module or to allow the correlating module to edit the associated attributes.

6. The system for graphical resources management according to claim 1, further including a tag module for tagging each of the graphical items with identification information, wherein the database further stores the identification information.

7. The system for graphical resources management according to claim 6, wherein the tag module includes a recognition unit for recognizing at least one graphical feature in each of the graphical items to generate the identification information.

8. The system for graphical resources management according to claim 6, further including a searching module for allowing a search criterion to be inputted and searching from the database a graphical item tagged with identification information matching the search criterion, and/or a graphical item with graphical features matching the search criterion.

9. The system for graphical resources management according to claim 1, wherein the correlating module includes a touch panel displaying the plurality of graphical items, for allowing the plurality of graphical items to be dragged/selected for edit of the associated attributes.

10. A method for graphical resources management including the steps of:

importing at least one graphical resource;

capturing a plurality of groups of pixels from the graphical resource to generate a plurality of graphical items;

editing at least one associated attribute to define relationships between the plurality of graphical items;

storing the plurality of graphical items and the associated attributes; and generating a graphical data structure according to the associated attributes to demonstrate the relationships between the plurality of graphical items, wherein the plurality of graphical items include a plurality of first, second, and third layer graphical items, and the step of editing at least one associated attribute edits first level relationships between the first and second layer graphical items and the second level relationships between the second and third layer graphical items; the method further includes a step of generating flashcards, each with a front side card face and a back side card face for demonstrating the first level relationships or the second level relationships, wherein when the first level relationships related to an item being demonstrated, the front side card face shows the first layer graphical items, and the back side card face shows the second layer graphical items correlated to the first layer graphical items; when the second level relationships related to an item being demonstrated, the front side card face shows the second layer graphical items, and the back side card face shows the third layer graphical items correlated to the second layer graphical items.

11. The method for graphical resources management according to claim 10, further including the steps of:

defining at least one demonstration rule by which the relationships between the plurality of graphical items are demonstrated;

capturing an image to obtain the graphical resource;

tagging each of the graphical items with identification information and storing the identification information;

recognizing at least one graphical feature in each of the graphical items to generate the identification information; and inputting a search criterion and searching a graphical item tagged with identification information matching the search criterion.

12. The method for graphical resources management according to claim 10, wherein the step of capturing a plurality of groups of pixels further includes analyzing at least one graphical feature in the graphical resource or selecting at least one graphical feature in the graphical resource to generate the groups of pixels for capture or allow the associated attributes to be edited.

13. The method for graphical resources management according to claim 10, wherein the step of editing at least one associated attribute further includes displaying the plurality of graphical items and allowing the plurality of graphical items to be dragged/selected to edit associated attributes.

* * * * *